(12) United States Patent
Leymann et al.

(10) Patent No.: US 9,430,745 B2
(45) Date of Patent: Aug. 30, 2016

(54) PRE-EXECUTING WORKFLOW PREPARATION ACTIVITIES BASED ON ACTIVITY PROBABILITIES AND SYSTEM LOAD AND CAPACITY THRESHOLD REQUIREMENTS

(75) Inventors: Frank Leymann, Aidlingen (DE); Simon Moser, Tuebingen (DE); Friedemann Schwenkreis, Leinfelden-Echterdingen (DE)

(73) Assignee: International Business Machines Corporation, Armonk, NY (US)

( * ) Notice: Subject to any disclaimer, the term of this patent is extended or adjusted under 35 U.S.C. 154(b) by 2433 days.

(21) Appl. No.: 11/610,525

(22) Filed: Dec. 14, 2006

(65) Prior Publication Data

US 2007/0143166 A1      Jun. 21, 2007

(30) Foreign Application Priority Data

Dec. 21, 2005   (EP) .................................. 05112554

(51) Int. Cl.
     *G06Q 10/06*      (2012.01)

(52) U.S. Cl.
     CPC .......... *G06Q 10/06* (2013.01); *G06Q 10/0633* (2013.01); *G06Q 10/06316* (2013.01)

(58) Field of Classification Search
     CPC ....................... G06Q 10/06; G06Q 10/06316
     See application file for complete search history.

(56) References Cited

U.S. PATENT DOCUMENTS

| | | | | |
|---|---|---|---|---|
| 5,537,485 A * | 7/1996 | Nishikawa et al. | .......... | 382/130 |
| 5,854,903 A * | 12/1998 | Morrison et al. | ............. | 709/249 |
| 5,883,983 A * | 3/1999 | Lee et al. | ....................... | 382/268 |
| 5,958,003 A * | 9/1999 | Preining et al. | .............. | 718/100 |
| 5,999,911 A * | 12/1999 | Berg et al. | ......................... | 705/9 |
| 6,031,990 A * | 2/2000 | Sivakumar et al. | .......... | 717/124 |
| 6,098,064 A * | 8/2000 | Pirolli et al. | | |
| 6,154,767 A * | 11/2000 | Altschuler et al. | ........... | 709/203 |
| 6,442,608 B1 * | 8/2002 | Knight et al. | ................. | 709/225 |
| 6,601,035 B1 * | 7/2003 | Panagos et al. | ................... | 705/8 |
| 6,832,201 B1 * | 12/2004 | Leymann et al. | ................. | 705/7 |
| 6,853,952 B2 * | 2/2005 | Chadwick | ...................... | 702/181 |
| 6,895,128 B2 * | 5/2005 | Bohnenkamp | ................ | 382/305 |
| 6,970,587 B1 * | 11/2005 | Rogers | .......................... | 382/132 |
| 7,086,023 B2 * | 8/2006 | Visweswariah | ................... | 716/6 |
| 7,089,370 B2 * | 8/2006 | Luick | ............................ | 711/137 |
| 7,127,716 B2 * | 10/2006 | Jin et al. | ....................... | 718/105 |
| 7,136,967 B2 * | 11/2006 | Sawdey | ........................ | 711/128 |

(Continued)

OTHER PUBLICATIONS

Silva, Ricardo et al., Probabilitic Workflow mining KDD'05, Aug. 2005.*

(Continued)

*Primary Examiner* — Scott L Jarrett
(74) *Attorney, Agent, or Firm* — Jordan IP Law, LLC

(57) ABSTRACT

In a Workflow Management System with a workflow having a sequence of activities of an underlying business process, logical wait situations occur when a given activity depends upon completion of a prerequisite preparation activity. A method for decreasing the resulting run-time delays includes: identifying a primary activity and an associated preparation activity required to be done before executing the primary activity; navigating through the process template of the underlying workflow and calculating the probability at a node of the process template that the primary activity will be reached for a current process instance; and pre-executing the preparation activity in parallel to the activity sequence if the probability exceeds a predetermined threshold.

13 Claims, 5 Drawing Sheets

(56) References Cited

U.S. PATENT DOCUMENTS

| | | | |
|---|---|---|---|
| 7,272,820 B2* | 9/2007 | Klianev | 717/109 |
| 7,350,209 B2* | 3/2008 | Shum | 718/104 |
| 7,386,850 B2* | 6/2008 | Mullen | 718/104 |
| 7,412,520 B2* | 8/2008 | Sun | 709/227 |
| 7,522,175 B2* | 4/2009 | Morita et al. | 345/619 |
| 7,565,340 B2* | 7/2009 | Herlocker et al. | 706/52 |
| 7,721,331 B1* | 5/2010 | Rowe | 726/22 |
| 2003/0036940 A1* | 2/2003 | Leymann et al. | 705/8 |

OTHER PUBLICATIONS

Doshi, Prashant et al., Dynamic Workflow Composition using Markov Decision Processes International Journal of Web Services Research, vol. 2, No. 1, Jan./Mar. 2005.*

Kanzow, Sebastin et al., Task Scheduling based on Probablistic Constraint Propagation for Distributed Workflow Enactment Processings of the 2004 IEEE Conference of Cyberneitcs and intelligent Systems, Dec. 2004.*

Heumann, Brian et al., Websphere Process Service v6.0 Business Process Choreographer Programing Model IBM, Jan. 2006.*

Grigori, Daniela et al., Anticipation to Enhance Flexibility of Workflow Execution DEXA 2001, 2001.*

Doshi, Prashant et al., Dynamic Workflow Composition using Markov Decision Processes International Journal of Web Services Research, vol. 2, No. 1, Jan.-Mar. 2005.*

Jiang, Zhime et al., Web Prefetching in a Mobile Environment IEEE Peronal Communications, Oct. 1998.*

Silva, Ricardo et al., Probabilistic Workflow Mining ACM, KDD'05, Aug. 21-24, 2005.*

Panagos, Euthimios et al., Predictive Workflow Management in Proceedings of the 3rd International Workshop on Next Generation Information Technologies and Systems, 1997.*

Bauer, Thomas et al., A Distributed Execution Environment for Large Scale Workflow Management Systems with Subnets and Server Migraion, IEEE, 1997.*

* cited by examiner

PRE-EXECUTING WORKFLOW PREPARATION ACTIVITIES BASED ON ACTIVITY PROBABILITIES AND SYSTEM LOAD AND CAPACITY THRESHOLD REQUIREMENTS

FIELD OF THE INVENTION

The present invention relates to a Workflow Management System (WFMS) or a computer system with comparable functionality. More particularly, it relates to a method for operating a workflow management system wherein the workflow comprises a sequence of activities of an underlying business process.

BACKGROUND

Workflow Management Systems (WFMS) support the modeling and execution of business processes. Business processes executed within a WFMS environment specify which piece of work of a network of pieces of work is carried out in which sequence. The individual pieces of work might be distributed across a multitude of different computer systems connected by some type of network.

FIG. 1 illustrates the creation and use of a prior art workflow system. A modeling tool 10 is implemented on a development computer thus providing a developments environment. This tool is used for creating all necessary process definitions, henceforth called the process template, required to implement a given desired business process within the workflow system.

Once the process template is ready, it is deployed on a Workflow Application Server 14 such that instances of it can be executed by a workflow engine 15. The Application Server 14 and the workflow engine 15 are provided with all required interface functionality in order to be operatively connected to a (one of a plurality of) client system 17 acting as participant to the workflow, to a database 16 which stores process relevant business data, and to a staff database 18, present for storing any staff related data required for distributing the activities in the workflow to different staff members.

IBM WebSphere Business Process Choreographer represents such a Workflow Application Server. It supports the definition of business processes as a network of activities. The network of activities, the process template, is constructed from a set of activities which define the individual tasks that need to be carried out. The definition of the process template is done via a graphical editor in a flow definition language such as the Business Process Execution Language for Web Services (BPEL4WS). In this language, the activities are represented using the Web Services Definition Language (WSDL).

As already mentioned, a business process is a network of activities that are executed in an ordered way, either sequentially or in parallel. Such a business process is modeled into a process template, which gets instantiated every time someone sends some data to initiate a process instance for a specific case. Based on that data, internal decisions are made by the process, resulting in a specific navigation path through each instance of the process template.

For example, when requesting a travel approval in a company a series of activities must be done before an approval is obtained. One activity would be to send a message containing the itinerary of the travel request to the first line manager responsible for the requesting staff member. A conditional branch in this process is, for example, if the approximate travel cost is less than 1000 Euro, only the first line manager must approve; otherwise, both the first and the second line manager must approve.

Certain activities referred to herein as "primary activities" of a process have some prerequisites that need to be fulfilled before the primary activities can be executed. For instance, if something has to be sent by postal services it needs to be wrapped first.

Usually, in a business process implemented by a prior art Workflow System, the prerequisites or preconditions are ensured to be fulfilled by activities that are executed directly before the primary activity is actually executed that requires the conditions. Those activities are referred to herein as "preparation activities". Ordinarily, there is a sequential dependency between the preparation activity and the primary activity.

However in prior an Workflow Systems the primary activity itself has no control means associated with itself for determining whether the preparation activity has already been executed before the primary activity actually starts. In the example of sending a packet, the send activity "does not care" at which time the wrapping activity actually took place.

However, during modeling of processes, humans often keep the preparation activities and the primary activities close together in order to indicate their internal inter-relationship. This is basically a very useful means for providing clarity of the business process in question and thus helps to self-explain and comment the business process to any person occupied with administration and care of the workflow over the years of business practice.

This useful and typically "human" design attitude, however, often results disadvantageously in a logical wait situation during execution, because any primary activity needs to wait for the respective preparation activity to be completed before it may start executing. This waiting time increases the elapsed time of a workflow process to be completed, and results in a respective run-time delay, which is often not tolerable in a modern and efficient business practice and should thus be avoided.

Prior art Workflow systems do not offer a satisfying solution to this problem. Instead, the workflow must be re-designed after having identified such problems. This, however, is quite expensive, as it includes a re-building of the underlying process template and eventually involves a new test phase before the new version can be run in a normal productive way of operation. Further, disadvantageously, it may happen that after the work-flow was re-designed new problems of the same genre arrive, which were not visible before. Thus, possibly multiple iterations of workflow re-design are required before a significant overall workflow improvement may be achieved. This, however, is not tolerable in regard of the typically very high requirements of availability of such workflow systems in most businesses.

It is thus an objective of the present invention to provide a method for running a workflow comprising a sequence of activities of an underlying business process, which has an improved run-time delay, in particular, when pairs of preparation activities and primary activities occur in the business process.

SUMMARY

The current invention proposes a mechanism to detect the need for executing preparation activities and to start the execution of preparation activities at the earliest point in time during the execution of a business process. Thus the above-mentioned waiting time for a primary activity later on in the process is reduced compared to prior art.

The present invention includes a method for running a workflow comprising a sequence of activities. The method is characterized by the steps of a) managing an identification of a pair of a primary activity and an associated preparation activity required to be done before executing the primary activity, b) navigating through the process template of the underlying workflow, and checking, preferably at a node of the process template, the probability at the primary activity will be reached for a current process instance, and c) pre-executing the preparation activity in parallel to the actual activity sequence, if the probability exceeds a predetermined threshold. This saves total elapsed time for the activity sequence.

The activity pairs can be identified preferably at modeling time. If this is done by a developer, who already has some experience and user feedback from a preceding business use of the business model under development, then the pairs are selected freely and independently of any instance-dependent run-time properties, and thus run-time saving is expected to be very significant, as per se many pairs are able to be identified.

When further a threshold is preset locally for an individual activity pair, then the method can be adjusted very well to the individual run-time properties of the majority of instances running the process template.

When further a threshold is preset globally for all activity pairs, then the advantage is obtained that the effort to determine the thresholds is very low while the quality of the prediction might be a bit lower.

When the threshold is preset statically, then the additional advantage is obtained that the threshold can be determined faster than in case of a dynamically changeable threshold.

When a threshold is preset dynamically during runtime, then the additional advantage is obtained that the threshold can be adapted to changes in the execution, thus resulting in more accurate predictions minimizing the cases of unnecessary execution of the preparation activities.

When the before-mentioned probability calculation is done at only a subset of nodes and not at each node when navigating through the process template during runtime, then the additional advantage is obtained that the run-time delay is further decreased in certain cases where a time delay is involved with the probability calculation itself at specific nodes.

When further the definition of the threshold is driven by the current system load and capacity of the workflow system then the additional advantage is obtained that the inventive method, when applied in load-sensitive environments, can best be adapted to the current system load.

In other words, a key concept of the present invention includes the idea of predicting the future execution of preparation activities in order to allow the execution of these activities at an early point in time, earlier in the workflow sequence compared to prior art. Several techniques can be used to implement the prediction. They include, however, more or less the principle that an execution probability model (EPM, see FIG. 2) can be derived for the execution of activities based on the history of process executions. The risk of doing some unnecessary work, if the primary activity is not needed to be executed, can be set and thus adjusted to individual needs.

A possible way to achieve that can be directly derived from Bayes' Theorem for statistical inference. Bayes' theorem helps to predict a future state X based on prior knowledge. Prior knowledge, in the scope of the present invention, may be the probability density function abbreviated herein as PDF, regarded over all previous process instances. This means that there is an initial PDF created when the very first instance of the process is created which then gets updated during the execution of a process instance, yielding to a 'final' PDF which then serves as an initial PDF for the next process. The inference model used therein is a probability value $p(x)$ which determines if a state 'A' is followed by a state 'B'.

Based on the PDF, the probability for executing a future activity can be determined. Using a threshold as described above allows then to predict the execution of a future activity with a certain confidence. This threshold can be user-defined.

BRIEF DESCRIPTION OF THE DRAWINGS

The present invention is illustrated by way of example, with reference to drawings in which.

DETAILED DESCRIPTION

Figure 1:
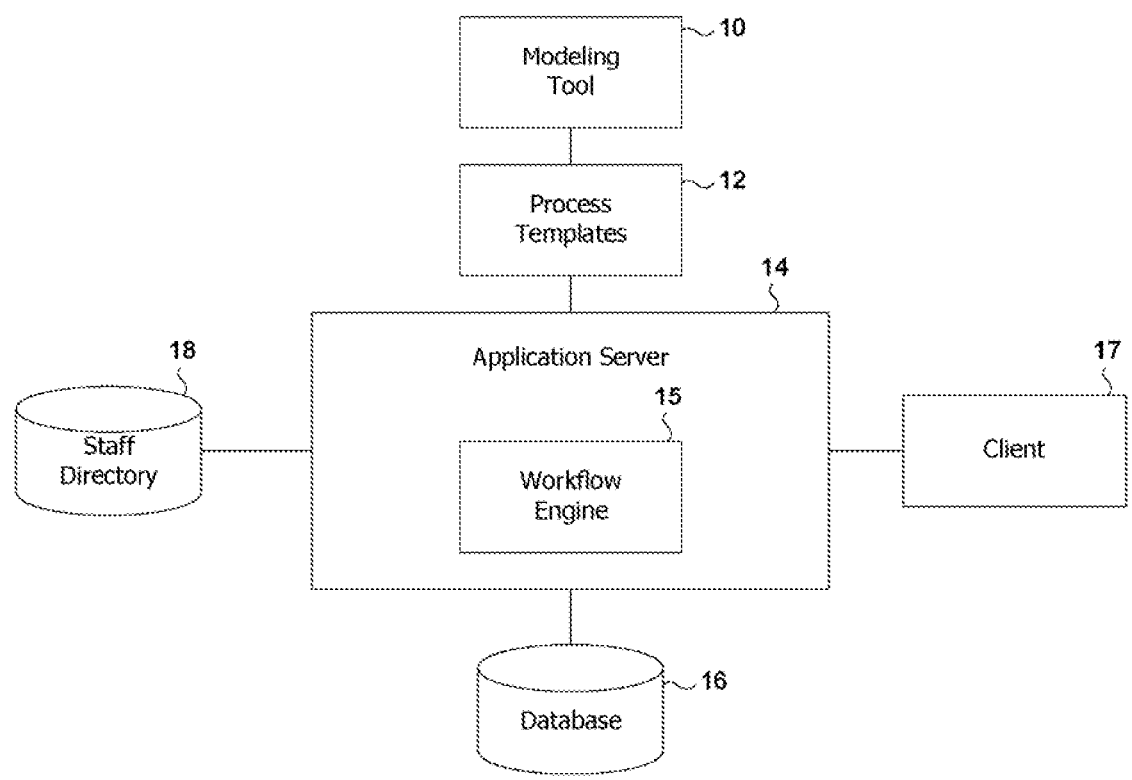
FIG. 1 is a schematic block diagram representation of a prior art workflow system illustrating the system structure of the basic functional system elements.
Figure 2:
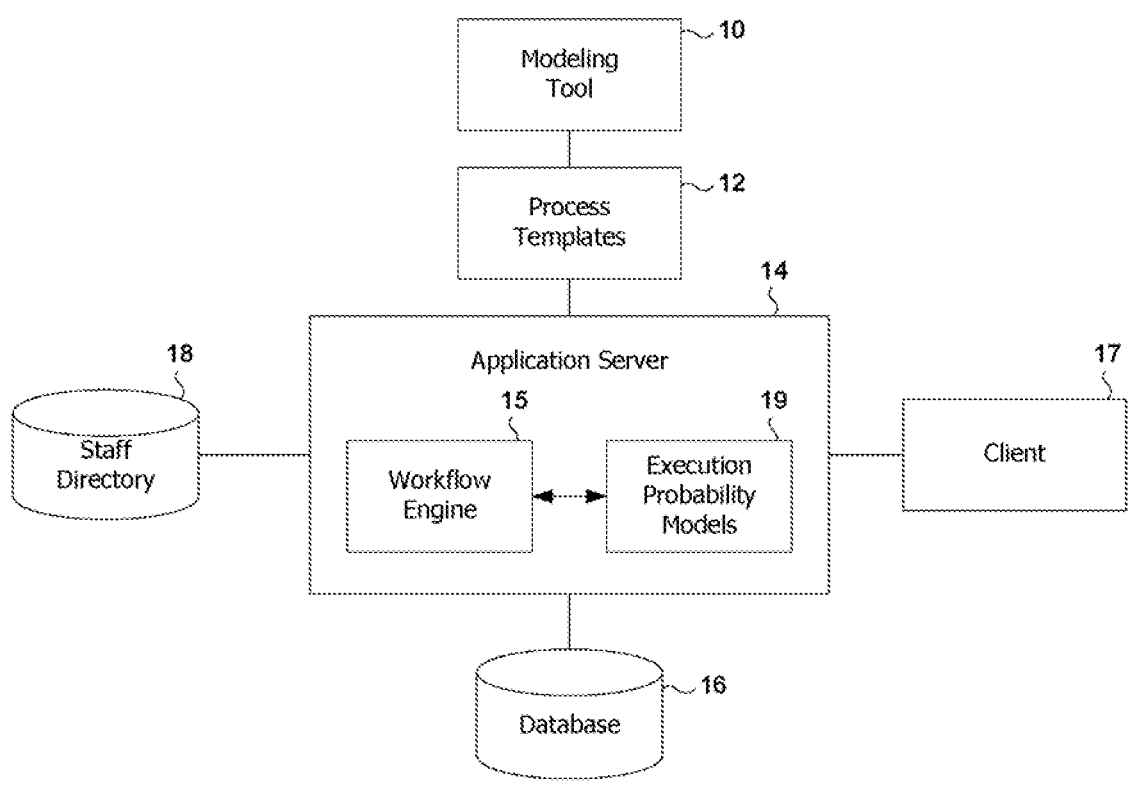
FIG. 2 is a representation according to FIG. 1, but implementing a new component implementing the inventive method.

With general reference to the figures and with special reference now to FIG. 2, the prior art application server is enriched by a component 19 depicted as Execution Probability Models (EPM). The component 19 is symbolically depicted to include the majority of functionality offered by the inventive method. This component 19 has a functional interface to the workflow engine and can be implemented for example as a program component thereof.

Figure 3:
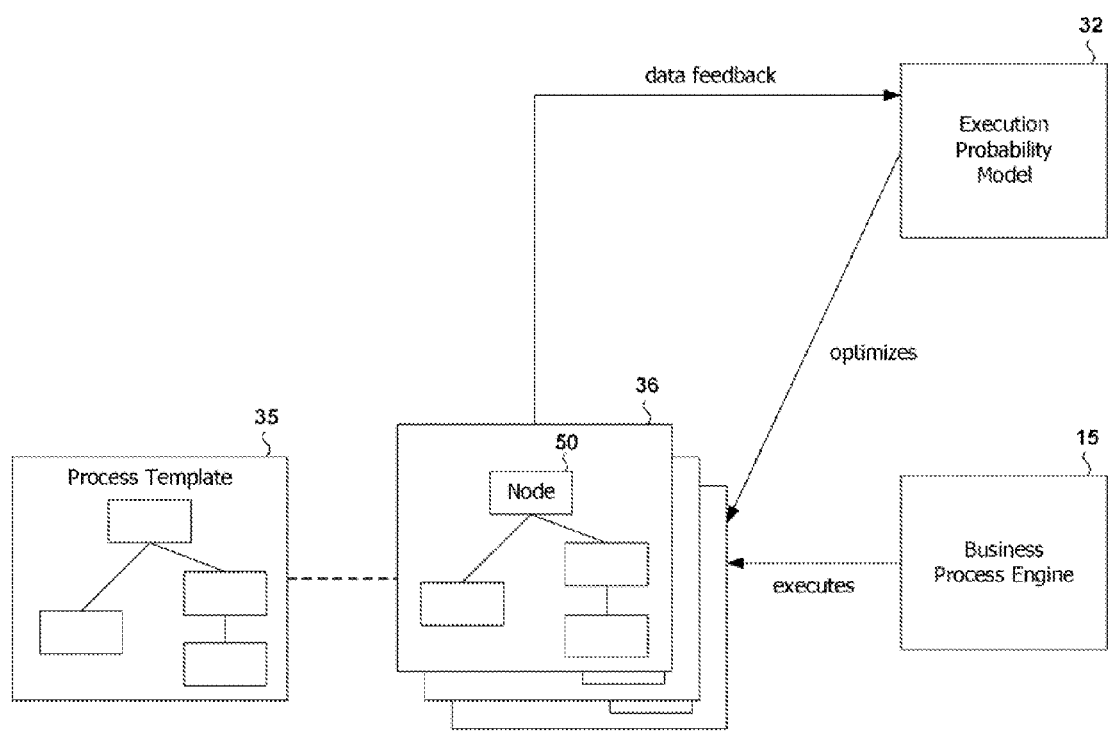
FIG. 3 is a schematic block diagram representation illustrating details of the system depicted in FIG. 2.

With reference to FIG. 3, a run-time view onto the inventive Application server 14 (FIG. 2) discloses the process engine 15 which executes a plurality of process instances 36 of the same process template.

Figure 4:
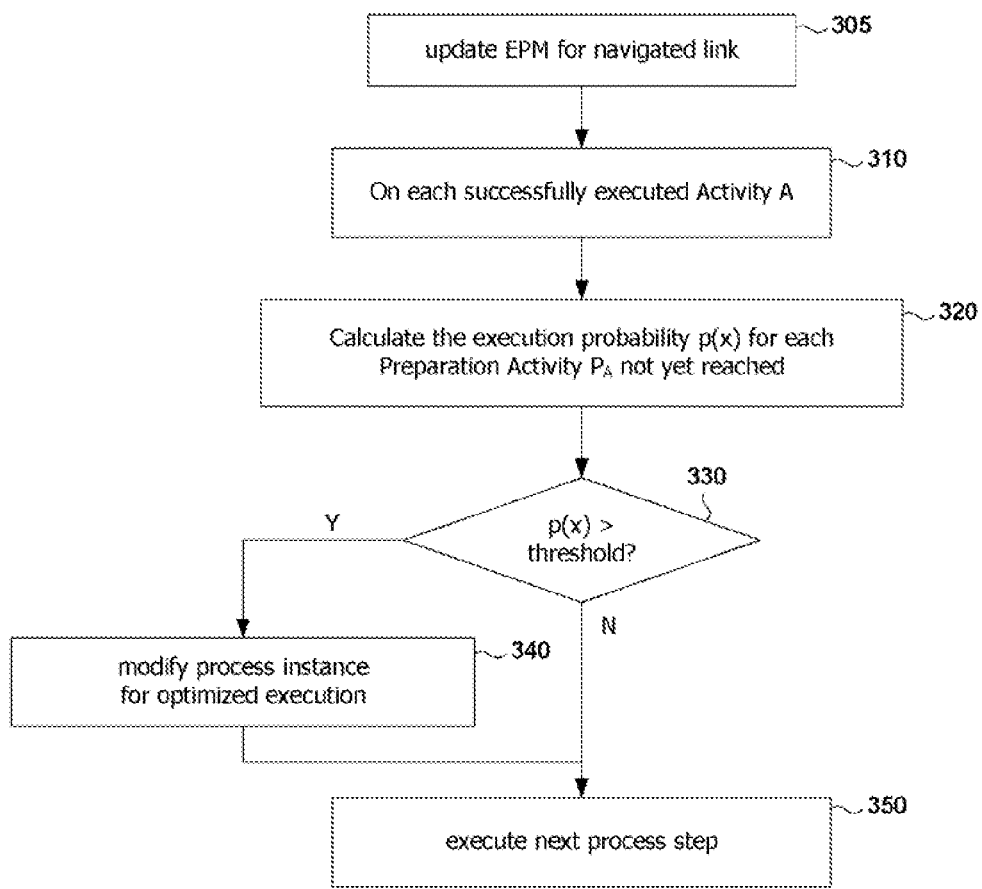
FIG. 4 is a schematic block diagram representation of the run-time control flow of the core of the inventive method according to a preferred embodiment thereof.

The process instances 36 feed the EPM 32 with measured performance data obtained during runtime, which serves as a feedback information in order to enable the EPM to update its probability calculations dynamically during the run-time of a process instance (see also step 305 in FIG. 4).

EPM 32 in turn calculates the probabilities according the rules described below in more detail and generates output information, which serves as a control input to the process instances. This procedure is repeated multiple times during the workflow processing.

A process template 35 is depicted as connected with a broken line to the instances 36 comprising the activity nodes as depicted with node 50 for example, in order to clarify that the interaction between process instances 35 and execution probability model 36, and the business process engine 15 does not update the process template. In more detail, the inventive method does not change the template of a process except for possibly identifying preparation activities. Hence, the inventive method provides runtime optimization of prior art workflow systems, which may be applied to any process instances on an "as-needed basis" rather than requiring optimization of the whole templates for certain use cases.

Figure 5:
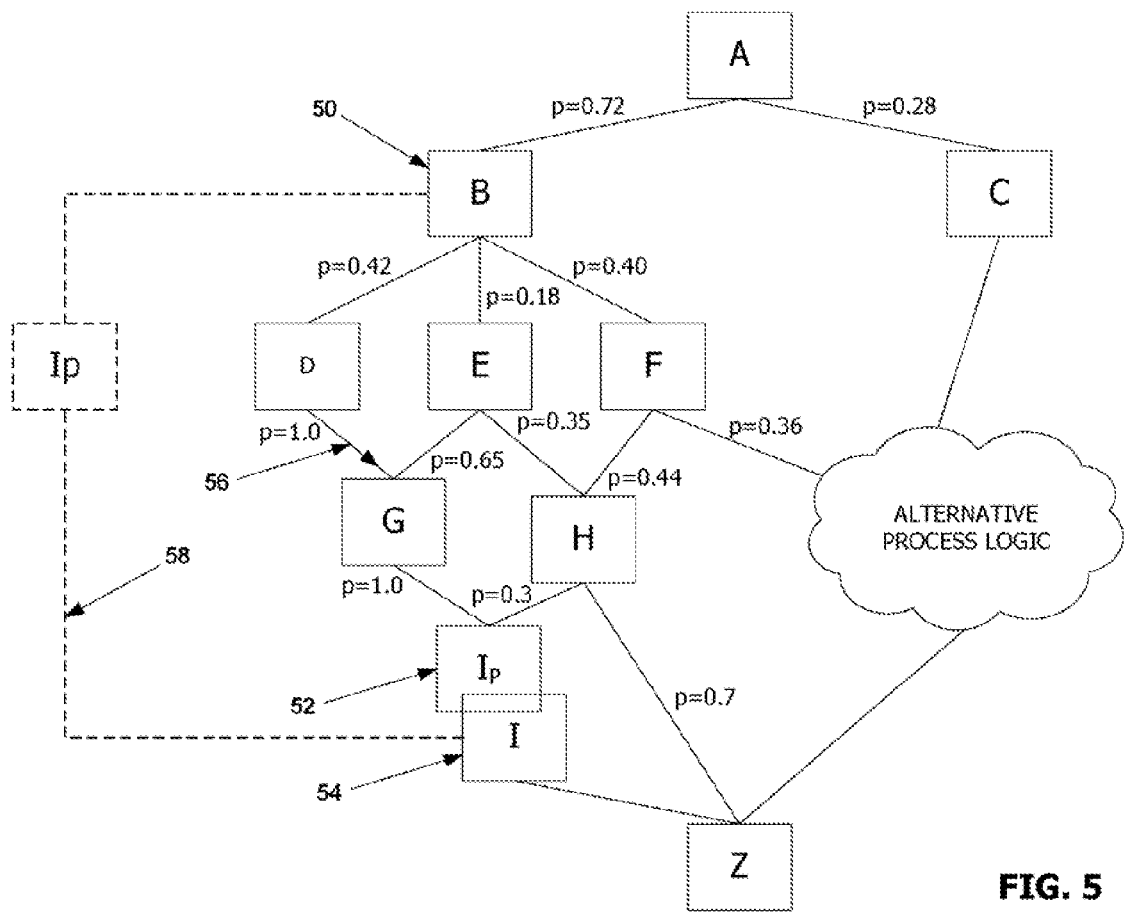
FIG. 5 is a schematic block diagram representation of a sample process template of a workflow including probabilities annotated for each node-to node transition between nodes A, B, . . . Z.

With additional reference to FIGS. 4 and 5, the run-time control flow of the core of the inventive method according to a preferred embodiment thereof is illustrated. It should be added that in this embodiment an activity pair 52, 54 (FIG. 5) is already identified during modeling time and is stored in main memory in any adequate format allowing the engine to know which activity is the primary activity 54, and which one of the pair is the preparative activity 52, in order to be processed by the workflow engine during run-time.

FIG. 5 illustrates an example for a workflow in which the invention can be advantageously applied. According to FIG. 5 the work-flow engine navigates through the network of activities according to the process template in order to process them. Such a situation is depicted in FIG. 5, where the rectangles A, B, . . . Z represent activities. When an activity has been successfully executed (see step 310 in FIG. 4), the program component EPM 32 (FIG. 3) calculates the execution probability p(x) for each preparation activity which has not yet been reached.

In more detail, a kind of measurement step is done as follows: The current state of the process is evaluated at a discrete activity, for example at activity 50 (B) in FIG. 5.

The business process behind the workflow depicted in FIG. 5 is assumed to have a "critical" primary activity 54 denoted as I, which can only be executed by a single person in the company.

Now if the process engine is enabled to "know" that whenever it reaches Activity 50 'B' (see other arrow) there is a 95% probability for also reaching Activity 'I', then, in this example, the process can make sure that this person has to be available for the next 36 hours. This is expressed by preparation activity 52 "Ip", depicted just above activity I. So in case there is a preparation activity 52 Ip present, this activity Ip can already be executed in parallel to the rest of the workflow, at the point in time when a program function has detected that activity I needs to be or is likely to be executed in the future. This is expressed by the broken line path 58 added in parallel to the navigation field in FIG. 5.

With reference back to the measurement step, it is in particular evaluated whether there are any "preparation-primary" activity pairs 52, 54 present in the remaining part of the process template. If yes, the program continues with the evaluation step described next below. If not, then the normal process navigation is continued.

Evaluation is described in steps 320, 330 of FIG. 4. For each possible path (execution sequence of intermediate activities) from the current Activity 50 (for example activity B in FIG. 5) to the next "preparation-primary" activity pair 52, 54, a probability is calculated (see step 320 in FIG. 4) which is derived from preceding process instance data. That data is usually collected already in prior art by monitoring, tracking, and measuring the workflow processing. Respective monitoring and audit data sources are further served by the inventive method and are of course accessed for read in this special situation. The probability calculation 320 can be done successfully because there is an equivalency relation for all the paths between (in our example) B and I. This is illustrated in FIG. 5.

Possible paths from activity B to primary activity I are as follows: B-D-G-I; B-E-G-I; B-E-H-I; B-F-H-I. The associated probabilities based on the single edge probabilities as depicted in FIG. 5 are derived by multiplication of the single edge transition probabilities as follows:

| B-D-G-I; | p1 = 0.42 * 1.0 * 1.0 = 0.42 |
| B-E-G-I; | p2 = 0.18 * 0.65 * 1.0 = 0.117 |
| B-E-H-I; | p3 = 0.18 * 0.35 * 0.3 = 0.0189 |
| B-F-H-I. | p4 = 0.40 * 0.44 * 0.3 = 0.048 |

Then a decision 330 (FIG. 4) is taken for each preparation activity not yet reached, if the sum of the probabilities of all possible paths B-I (p1−p2+p3+p4)=0.6569 is greater than a predefined threshold level, also referred to herein as a "threshold", then it can be assumed that activity I will be executed in the future with this sum probability. It should be noted that the probability to reach activity I during runtime increases when approaching to it along one of the above mentioned paths. This has the required implication on the probability calculation in order to cross the threshold level at a certain point in time during navigation.

Thus in this case (see the Yes branch of decision 330), it would be an acceptable optimization strategy to execute the preparation activity Ip at the earliest point in time. This is understood generally as a step 340, which enables modification of the process instance for optimized execution by executing the evaluated preparation activities in parallel to the activities followed to navigated through in the actual navigation patch (see step 350), where the next usual process step is performed.

In a general sense and in an integrated view this means that each preparation activity found worth to be pre-executed can in theory be executed "in parallel" to the rest of the process navigation.

In a feedback step done also during the execution of a process instance, whenever one link between two activities has been navigated, there is a data feedback in order to update the EPM 32 as indicated in FIG. 3 and in step 305 of FIG. 4.

Thus, a person skilled in the art may appreciate that the key idea is to implement an algorithm comprising a sequence of measurement, evaluation, and update steps.

In a more general aspect, having such knowledge, a workflow process executing environment (WFMS) can autonomously make decisions regarding the optimization of a process execution. Other use-cases for this can easily be imagined, yielding an optimized business process through statistical analysis and prediction of future states.

Next, some implementation variations and details are given relating to the identification of preparation activities.

A basic requirement is that the inventive program component is able to have access to all data required for identifying preparation activities at runtime of the workflow.

Basically, every activity has a unique ID stored in database 16 (FIG. 2), which can be used for accessing input ports and output ports and other relevant information used within the workflow for execution an activity. Preferably pairs of primary and preparation activities are determined and stored within a separate table in database 16. Further, the above-mentioned threshold or a plurality of them is stored in the database 16. In case thresholds exist for each navigated node and for each of the activity pairs the thresholds are stored at each node.

There are basically two different variations for marking preparation activities, namely at modeling time, as it is preferred, or at run-time, by analyzing the monitored history data of preceding workflow instances.

At runtime, during navigation at preferably any node of the workflow network in question, the inventive program component should have access to the database 16 in order to read the thresholds and the probabilities associated with the relevant edges, e.g., edge 56 as described with reference to FIG. 5.

Preferably, a threshold or a plurality of them for distinct primary/preparation activity pairs 52, 54 can be input into a workflow control interface provided for the Administration User.

There are different possibilities to implement such configuration parameters. Some of them are mentioned next below and serve as sample implementations:

A single, global threshold can be defined at modeling time, which is valid globally for a whole process template (i.e. all preparation/primary pairs in the process template; or a plurality of local thresholds, for example valid locally for each node and each activity pair, but for a whole process template; or a single global threshold can be defined at runtime, which is valid globally for a single instance of the process template; or a plurality of local thresholds can be defined at runtime, which is valid locally for one or more instances, and which can be implemented in a self-adjusting way, with an update of a subset or the complete set of thresholds, which is controlled by a feedback from the monitoring data of preceding instances and some simple adaptation logic; or single, global threshold can be defined at runtime, which is valid globally for a single instance of the process template, which can be modified via any adequate administration tool.

Preferred is an implementation of a globally defined threshold at modeling time which can be updated at runtime for different instances of the process template, for example before an instance enters into the processing.

It should be appreciated that at least in a preferred embodiment of the invention any preparation activity should be marked and identified already at modeling time. Further, the probabilities as described above for transiting from one activity to the next should be stored related to the control links, i.e., the directed edges 56 between respective two nodes.

It is preferred to update the probability values always after a control link was worked on during navigation, or alternatively, once per batch when the process instance has been completed.

Further, the updated probability values can be used for calculating the execution probability for a navigation path along a predetermined node sequence, see FIG. 5 above, when it may reasonably assumed that the different paths are statistically independent from each other.

A person skilled in the art will understand that there is a broad spectrum of use cases, in which the invention can be advantageously applied, as pairs of primary activity and preparative activity are very frequently encountered in businesses of various fields.

An example for a pair of an activity and its associated preparation activity, which might be regarded as a typical scenario for the field of information processing, is a search activity for documents and its associated document index update activity.

A search can only be executed in an effective way if the corresponding index is up-to-date. Thus, the index has to be updated prior to a search. The indexing activity is independent from anything else that might be done prior to the search because there are no data dependencies. Furthermore, the cost for updating the index is well spent even if the predicted search will not happen because subsequent indexing on behalf of other process instances will benefit from the work that has already been done.

Another example frequently found in enterprises is the personal participation in a review meeting to review a document. A preparation activity for the meeting activity would be to actually study the document. This can be done at any point in time after the document has become available. There is no need to do it immediately before the meeting. So, if one knows that it is likely that the review meeting is going to happen then it would make sense to have the "review document activity" started right away. However, it might be somehow a waste of time if the review meeting will not happen. Further examples include activity pairs of: "negotiate rate/invoke service", "ensure appropriate expiration date of credit card/payment", or "acquire access rights/access".

The present invention can be realized in hardware, software, or a combination of hardware and software. A workflow parallelization tool according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which, when loaded in a computer system, is able to carry out these methods. Computer program means or computer program in the present context mean any expression, in any language, code or notation, of a set of instructions intended to cause a system having an information processing capability to perform a particular function either directly or after either or both of the following:
a) conversion to another language, code or notation; b) reproduction in a different material form.

What is claimed is:
1. A method for operating a workflow system wherein the workflow comprises a given sequence of activities executed by a computer processor, comprising:
   automatically identifying a pair of a primary activity and an associated preparation activity required to be done before executing the primary activity;
   navigating through a process template of underlying workflow, and calculating a probability at a subset of nodes of the process template that said primary activity will be reached for a current process instance;
   pre-executing said preparation activity, by the computer processor, in parallel to said given sequence of activities when said probability exceeds a predetermined threshold stored in a computer storage device, wherein the predetermined threshold is determined by current system load and the workflow system's capacity, and wherein the process template of underlying workflow is unaltered; and
   performing a next scheduled process step of the process template of underlying workflow when the probability does not exceed the predetermined threshold, and wherein determining the predetermined threshold includes utilizing measured workflow system and system load performance data obtained during runtime to dynamically update the calculating of the probability and dynamically set the predetermined threshold.

2. The method according to claim 1, further comprising analyzing monitored history data of preceding workflow runtime instances for marking preparation activities.

3. The method according to claim 1, wherein said activity pairs are identified at modeling time.

4. The method according to claim 1, wherein a threshold is preset locally for an individual activity pair.

5. The method according to claim 1, wherein a threshold is preset globally for an individual activity pair.

6. The method according to claim 1, wherein a threshold is preset statically.

7. A computer program product for operating a workflow system wherein the workflow comprises a given sequence of activities, the computer program product comprising a computer usable medium having computer usable program code tangibly embedded therein, the computer usable medium comprising:

computer usable program code configured to automatically identify a pair of a primary activity and an associated preparation activity required to be done before executing the primary activity;

computer usable program code configured to navigate through a process template of the underlying workflow, and to calculate a probability at a subset of nodes of the process template that said primary activity will be reached for a current process instance;

computer usable program code configured to pre-execute said preparation activity in parallel to said given sequence of activities when said probability exceeds a predetermined threshold, wherein the predetermined threshold is determined by current system load and the workflow system's capacity, and wherein the process template of underlying workflow is unaltered; and computer usable program code to perform a next scheduled process step of the process template of underlying workflow when the probability does not exceed the predetermined threshold, and wherein determining the predetermined threshold includes utilizing measured workflow system and system load performance data obtained during runtime to dynamically update the calculating of the probability and dynamically set the predetermined threshold.

8. The computer program product according to claim 7, further comprising computer usable program code configured to analyze monitored history data of preceding workflow runtime instances for marking preparation activities.

9. The computer program product according to claim 7, wherein said activity pairs are identified at modeling time.

10. The computer program product according to claim 7, wherein a threshold is preset locally for an individual activity pair.

11. The computer program product according to claim 7, wherein said probability calculation is done when navigating through the process template during runtime.

12. The computer program product according to claim 7, wherein the threshold depends upon the current load and capacity of the workflow system.

13. An apparatus comprising:

means for automatically identifying a pair of a primary activity and an associated preparation activity required to be done before executing the primary activity;

means for navigating through a process template of underlying workflow, and calculating a probability at a subset of nodes of the process template that said primary activity will be reached for a current process instance;

means for pre-executing said preparation activity in parallel to said given sequence of activities when said probability exceeds a predetermined threshold stored in a computer storage device, wherein the predetermined threshold is determined by current system load and the workflow system's capacity, and wherein the process template of underlying workflow is unaltered; and means for performing a next scheduled process step of the process template of underlying workflow when the probability does not exceed the predetermined threshold, and wherein determining the predetermined threshold includes utilizing measured workflow system and system load performance data obtained during runtime to dynamically update the calculating of the probability and dynamically set the predetermined threshold.

\* \* \* \* \*